United States Patent
Murray

[11] Patent Number: 5,853,125
[45] Date of Patent: Dec. 29, 1998

[54] RAINFALL DETECTING AUTOMATIC SPRINKLER CONTROL SYSTEM

[76] Inventor: Steve Murray, 11539 Carlise Pl., Rancho Cucamonga, Calif. 91730

[21] Appl. No.: 883,587

[22] Filed: Jun. 26, 1997

[51] Int. Cl.$^6$ .................................................... B05B 12/08
[52] U.S. Cl. ............................................. 239/63; 137/78.3
[58] Field of Search ............................. 239/63; 137/78.3, 137/410, 412, 423, 429

[56] References Cited

U.S. PATENT DOCUMENTS

| | | | |
|---|---|---|---|
| 3,174,496 | 3/1965 | Hoeppel | 239/63 X |
| 3,339,842 | 9/1967 | Hoeppel | 239/63 X |
| 3,374,324 | 3/1968 | McGrann | 137/410 |
| 3,628,194 | 12/1971 | Liliendahl | 137/236 |
| 3,840,180 | 10/1974 | Wagner | 239/63 X |
| 4,055,200 | 10/1977 | Lohoff | 239/63 X |
| 4,114,647 | 9/1978 | Furman | 239/63 X |
| 4,607,399 | 8/1986 | Yovanofski | 137/429 |

FOREIGN PATENT DOCUMENTS 1193730  11/1985  U.S.S.R. .................................. 239/63

*Primary Examiner*—Kevin Weldon

[57] ABSTRACT

A new Rainfall Detecting Automatic Sprinkler Control System for controlling an automatic sprinkler system according to the amount of precipitation received. The inventive device includes a hollow conical member having a plurality of apertures projectable into ground, an elongated tube secured coaxially within the conical member, a float member within the tube, an insulated rod, a first and second contact, and a contact disc. The enlarged open end of the hollow conical member captures precipitation which is collected within thereof. The float member is elevated in relation to the amount of collected precipitation thereby elevating the insulated rod which opens the electrical connection between the first contact and the second contact for controlling the automatic sprinkler system.

5 Claims, 3 Drawing Sheets

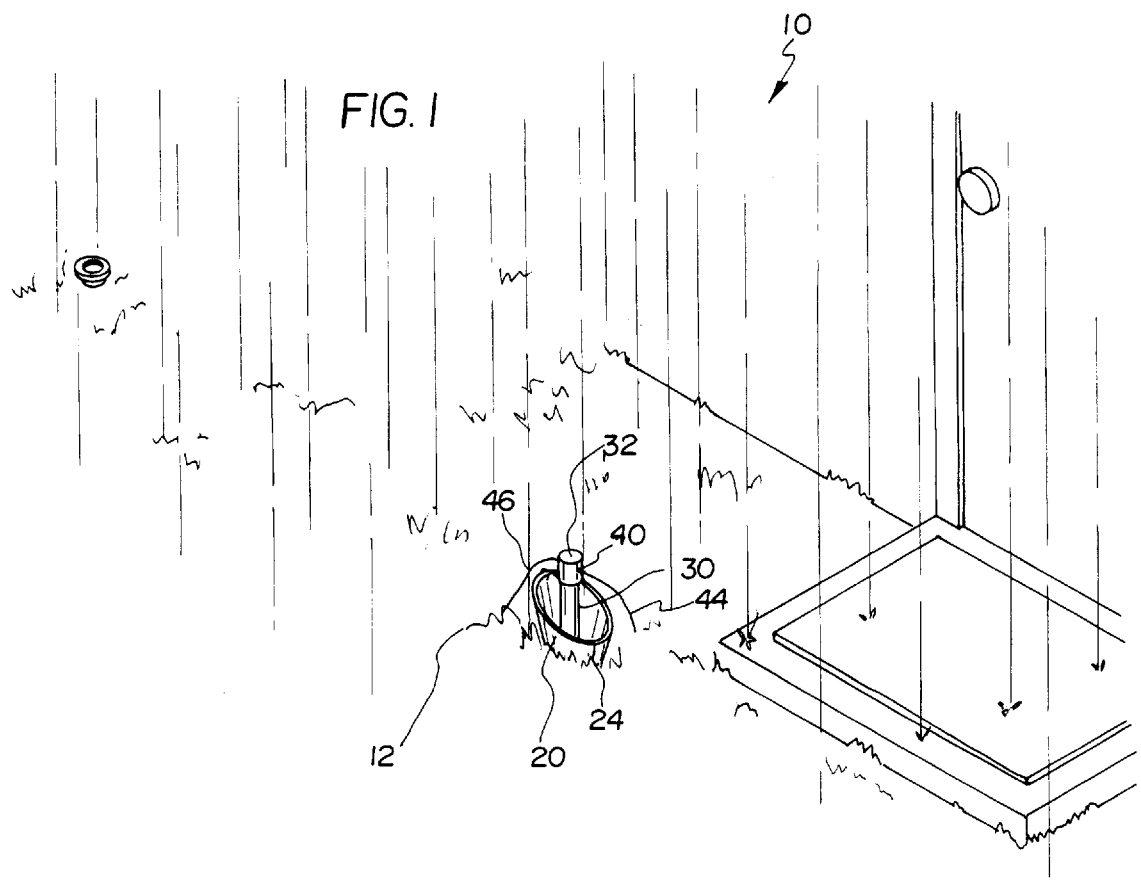
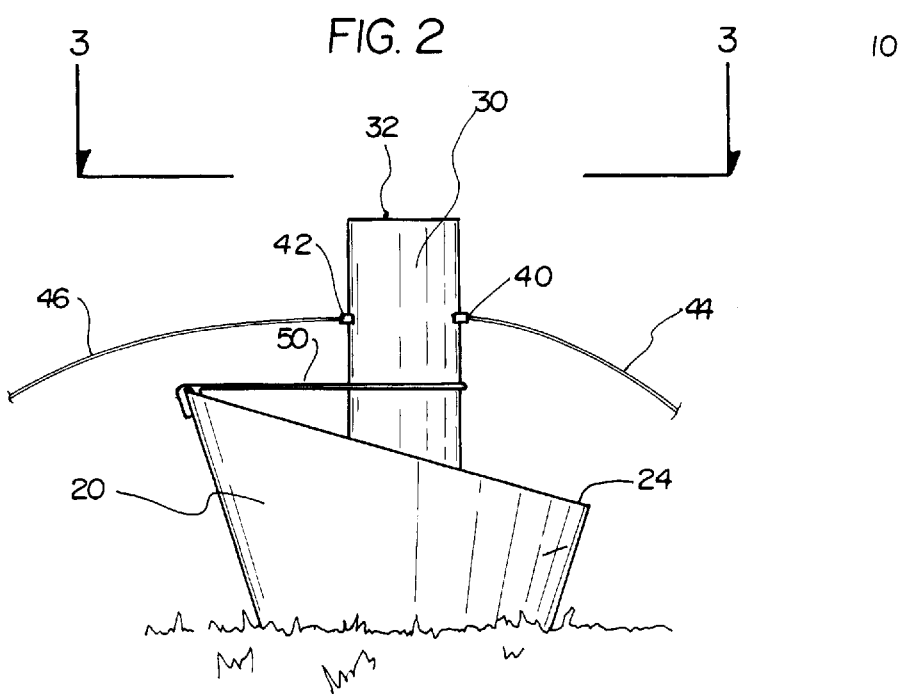

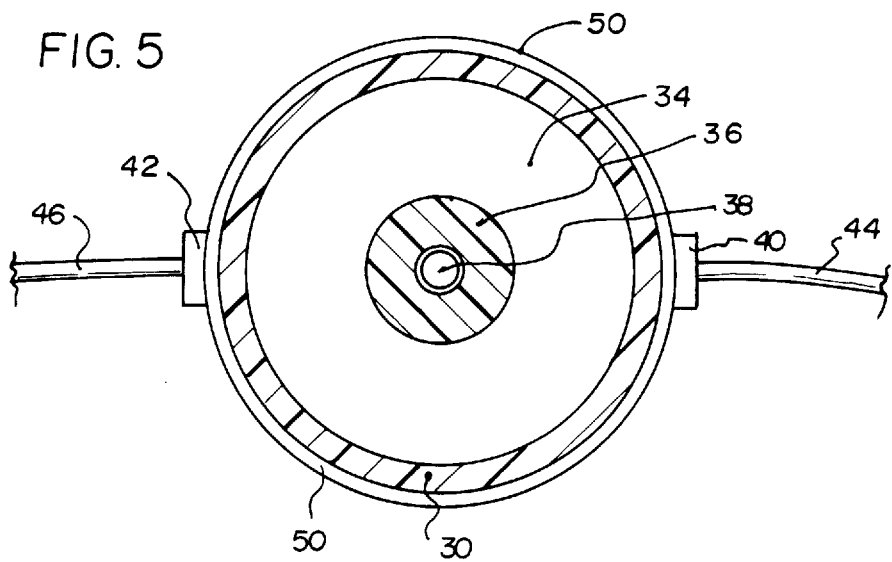
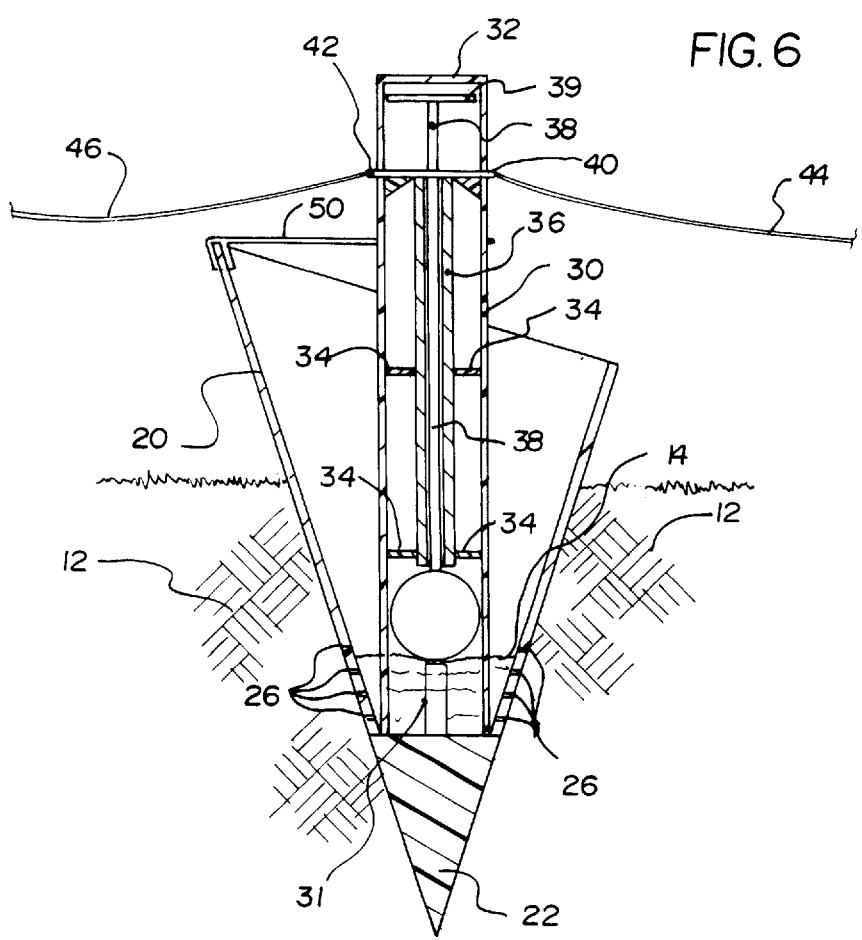

RAINFALL DETECTING AUTOMATIC SPRINKLER CONTROL SYSTEM

BACKGROUND OF THE INVENTION

1. Field of the Invention

The present invention relates to Automatic Sprinkler Control Devices and more particularly pertains to a new Rainfall Detecting Automatic Sprinkler Control System for controlling an automatic sprinkler system according to the amount of precipitation received.

2. Description of the Prior Art

The use of Automatic Sprinkler Control Devices is known in the prior art. More specifically, Automatic Sprinkler Control Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Automatic Sprinkler Control Devices include U.S. Pat. No. 5,337,777; U.S. Pat. No. 5,355,122; U.S. Pat. No. 5,087,886; U.S. Pat. No. 4,970,356; U.S. Pat. No. 4,613,764 and U.S. Design Pat. No. 316,981.

While these devices fulfill their respective, particular objectives and requirements, the aforementioned patents do not disclose a new Rainfall Detecting Automatic Sprinkler Control System. The inventive device includes a hollow conical member having a plurality of apertures projectable into ground, an elongated tube secured coaxially within the conical member, a float member within the tube, an insulated rod, a first and second contact, and a contact disc.

In these respects, the Rainfall Detecting Automatic Sprinkler Control System according to the present invention substantially departs from the conventional concepts and designs of the prior art, and in so doing provides an apparatus primarily developed for the purpose of controlling an automatic sprinkler system according to the amount of precipitation received.

SUMMARY OF THE INVENTION

In view of the foregoing disadvantages inherent in the known types of Automatic Sprinkler Control Devices now present in the prior art, the present invention provides a new Rainfall Detecting Automatic Sprinkler Control System construction wherein the same can be utilized for controlling an automatic sprinkler system according to the amount of precipitation received.

The general purpose of the present invention, which will be described subsequently in greater detail, is to provide a new Rainfall Detecting Automatic Sprinkler Control System apparatus and method which has many of the advantages of the Automatic Sprinkler Control Devices mentioned heretofore and many novel features that result in a new Rainfall Detecting Automatic Sprinkler Control System which is not anticipated, rendered obvious, suggested, or even implied by any of the prior art Automatic Sprinkler Control Devices, either alone or in any combination thereof.

To attain this, the present invention generally comprises a hollow conical member having a plurality of apertures projectable into ground, an elongated tube secured coaxially within the conical member, a float member within the tube, an insulated rod, a first and second contact, and a contact disc.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Rainfall Detecting Automatic Sprinkler Control System apparatus and method which has many of the advantages of the Automatic Sprinkler Control Devices mentioned heretofore and many novel features that result in a new Rainfall Detecting Automatic Sprinkler Control System which is not anticipated, rendered obvious, suggested, or even implied by any of the prior art Automatic Sprinkler Control Devices, either alone or in any combination thereof.

It is another object of the present invention to provide a new Rainfall Detecting Automatic Sprinkler Control System which may be easily and efficiently manufactured and marketed.

It is a further object of the present invention to provide a new Rainfall Detecting Automatic Sprinkler Control System which is of a durable and reliable construction.

An even further object of the present invention is to provide a new Rainfall Detecting Automatic Sprinkler Control System which is susceptible of a low cost of manufacture with regard to both materials and labor, and which accordingly is then susceptible of low prices of sale to the consuming public, thereby making such Rainfall Detecting Automatic Sprinkler Control System economically available to the buying public.

Still yet another object of the present invention is to provide a new Rainfall Detecting Automatic Sprinkler Control System which provides in the apparatuses and methods of the prior art some of the advantages thereof, while simultaneously overcoming some of the disadvantages normally associated therewith.

Still another object of the present invention is to provide a new Rainfall Detecting Automatic Sprinkler Control System for controlling an automatic sprinkler system according to the amount of precipitation received.

Yet another object of the present invention is to provide a new Rainfall Detecting Automatic Sprinkler Control System which includes a hollow conical member having a plurality of apertures projectable into ground, an elongated tube secured coaxially within the conical member, a float member within the tube, an insulated rod, a first and second contact, and a contact disc.

Still yet another object of the present invention is to provide a new Rainfall Detecting Automatic Sprinkler Control System that helps to conserve water utilized for watering a lawn.

Even still another object of the present invention is to provide a new Rainfall Detecting Automatic Sprinkler Control System that saves money during a rainy season.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an upper perspective view of a new Rainfall Detecting Automatic Sprinkler Control System according to the present invention.

FIG. 2 is a side view of the present invention.

FIG. 5 is a cross sectional view taken along line 5—5 of FIG. 4.

FIG. 6 is a cross sectional view taken along line 4—4 of FIG. 3 wherein the water level within the conical member has elevated the float member.

DESCRIPTION OF THE PREFERRED EMBODIMENT

Figure 3:
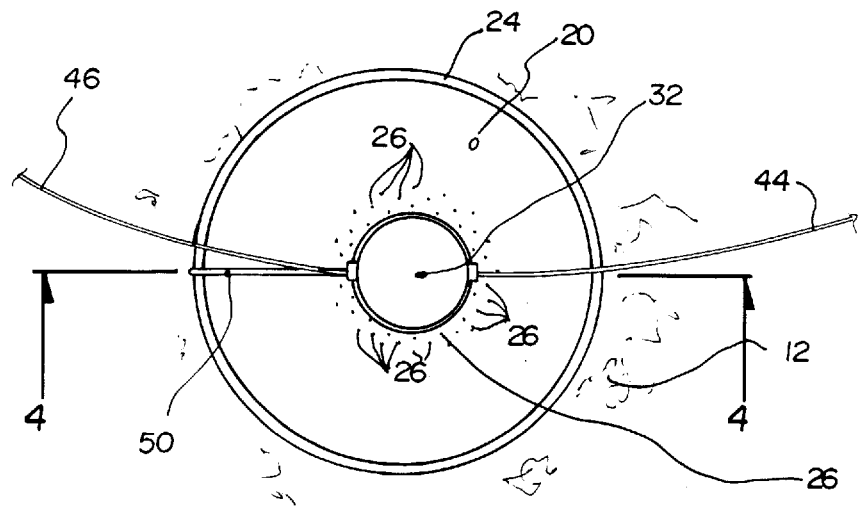
FIG. 3 is a cross sectional view taken along line 3—3 of FIG. 2.

With reference now to the drawings, and in particular to FIGS. 1 through 6 thereof, a new Rainfall Detecting Automatic Sprinkler Control System embodying the principles and concepts of the present invention and generally designated by the reference numeral 10 will be described.

Figure 4:
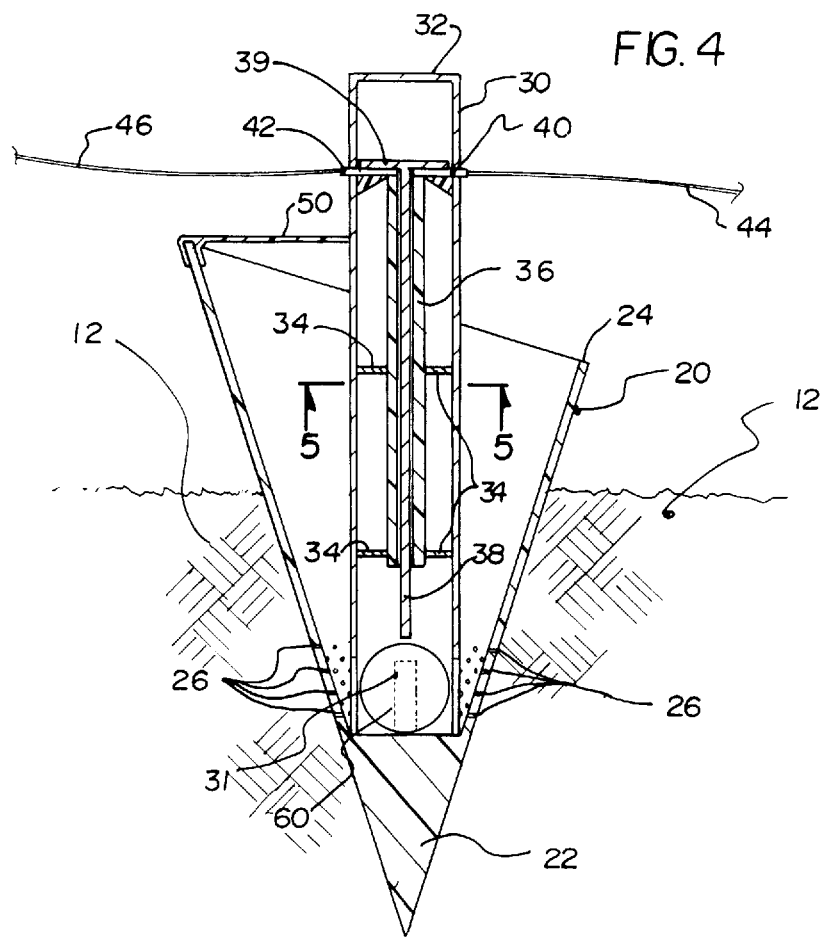
FIG. 4 is a cross sectional view taken along line 4—4 of FIG. 3.

More specifically, it will be noted that the Rainfall Detecting Automatic Sprinkler Control System 10 comprises a hollow conical member 20 having a pointed end 22 and an enlarged open end 24. The hollow conical member 20 preferably has a plurality of drain apertures 26 adjacent the pointed end 22 for allowing the collected water to drain from therein. The enlarged open end 24 is preferably slanted as shown in FIGS. 1, 2, 4 and 6. The pointed end 22 is for engaging within ground 12 near an automatic sprinkler system as shown in FIGS. 4 and 6. The enlarged open end 24 is for capturing precipitation as best shown in FIG. 1. An elongated tube 30 has a bottom end and a top end and is secured coaxially within the hollow conical member 20 as shown in FIGS. 3 through 6 of the drawings. The top end is preferably enclosed by an enclosing member 32. At least one slot 31 projects within the elongated tube 30 adjacent the bottom end for allowing collected precipitation within the hollow conical member 20 to flow into the elongated tube 30. An inner tube 36 is secured coaxially within the elongated tube 30 by a plurality of traverse members 34 as shown in FIGS. 4 and 6. An insulated rod 38 has a first end and a second end and slidably projects within the inner tube 36 as shown in FIGS. 4 and 6 of the drawings. A clip bracket 50 is preferably secured to the enlarged open end 24 and the elongated tube 30 for stabilizing the elongated tube 30 as shown in FIGS. 1 through 6 of the drawings.

A switching means is connected to the second end of the insulated rod 38 and the switching means electrically connected to the automatic sprinkler system for turning off the automatic sprinkler system upon the elevation of the insulated rod 38 within the inner tube 36. The switching means has a contact disc 39 secured concentrically and orthogonally to the second end of the insulated rod 38 as shown in FIGS. 4 and 6 of the drawings. A first contact 40 is secured within an upper portion of the hollow conical member 20 and is electrically connected to a first wire 44 of the automatic sprinkler system. A second contact 42 is secured within the upper portion of the hollow conical member 20 and is electrically connected to a second wire 46 of the automatic sprinkler system. The contact disc 39 electrically couples the first contact 40 with the second contact 42 when the float member 60 is at its lowest level as shown in FIG. 4 of the drawings. The contact disc 39 opens the electrical connected between the first contact 40 and the second contact 42 when the float member 60 elevates the contact disc 39 upwardly as shown in FIG. 6 of the drawings.

A float member 60 is slidably positioned within the bottom end of the elongated tube 30 and engages the first end of the insulated rod 38 for elevating the insulated rod 38 when a water level 14 within the elongated tube 30 rises from the collected precipitation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Rainfall Detecting Automatic Sprinkler Control System comprising:

a hollow conical member having a pointed end and an enlarged open end, wherein said pointed end is for engaging within ground near an automatic sprinkler system and wherein said enlarged open end is for capturing precipitation;

an elongated tube having a bottom end and a top end secured coaxially within said hollow conical member, wherein said top end is enclosed by an enclosing member;

at least one slot projecting within said elongated tube adjacent said bottom end for allowing collected precipitation within said hollow conical member to flow into said elongated tube;

an inner tube secured coaxially within said elongated tube by a plurality of traverse members;

an insulated rod having a first end and a second end slidably projecting within said inner tube;

a switching means connected to said second end of said insulated rod and said switching means electrically connected to said automatic sprinkler system for turning off said automatic sprinkler system upon the elevation of said insulated rod within said inner tube; and a float member slidably positioned within said bottom end of said elongated tube and engaging said first end of said insulated rod for elevating said insulated rod when a water level within said elongated tube rises from said collected precipitation.

2. The Rainfall Detecting Automatic Sprinkler Control System of claim 1, wherein said switching means comprises:

a contact disc secured concentrically and orthogonally to said second end of said insulated rod;

a first contact secured within an upper portion of said hollow conical member and electrically connected to a first wire of said automatic sprinkler system; and a second contact secured within said upper portion of said hollow conical member and electrically connected to a second wire of said automatic sprinkler system, wherein said contact disc electrically couples said first contact with said second contact when said float member is at its lowest level and wherein said contact disc opens the electrical connected between said first contact and said second contact when said float member elevates said contact disc upwardly.

3. The Rainfall Detecting Automatic Sprinkler Control System of claim 2, wherein said hollow conical member includes a plurality of drain apertures adjacent said pointed end for allowing said collected water to drain from therein.

4. The Rainfall Detecting Automatic Sprinkler Control System of claim 3, including a clip bracket secured to said enlarged open end and said elongated tube for stabilizing said elongated tube.

5. The Rainfall Detecting Automatic Sprinkler Control System of claim 4, wherein said enlarged open end is slanted.

* * * * *